US006915983B2

United States Patent
Thomassey et al.

(10) Patent No.: US 6,915,983 B2
(45) Date of Patent: Jul. 12, 2005

(54) PIVOTING POWER TRANSMISSION UNIT WITH LOAD TRANSFER VIA THE CASING

(75) Inventors: Lionel Thomassey, Fos sur Mer (FR); Thierry Sandrart, Velaux (FR)

(73) Assignee: Eurocopter, Marignane Cedex (FR)

( * ) Notice: Subject to any disclaimer, the term of this patent is extended or adjusted under 35 U.S.C. 154(b) by 106 days.

(21) Appl. No.: 10/612,452

(22) Filed: Jul. 2, 2003

(65) Prior Publication Data

US 2004/0038768 A1 Feb. 26, 2004

(30) Foreign Application Priority Data

Jul. 15, 2002 (FR) .............................................. 02 08896

(51) Int. Cl.[7] .............................................. B64C 27/52
(52) U.S. Cl. ........................ 244/17.25; 244/56; 244/66
(58) Field of Search ................................ 244/17.25, 56, 244/60, 66, 12.4; 416/148

(56) References Cited

U.S. PATENT DOCUMENTS 4,431,148 A 2/1984 Mouille
5,823,470 A 10/1998 Craig et al.
6,260,793 B1 7/2001 Balayn et al.
6,276,633 B1 8/2001 Balayn et al.
6,467,724 B2 * 10/2002 Kuenkler ................. 244/17.25

FOREIGN PATENT DOCUMENTS

WO    WO 03/040593    10/2002

* cited by examiner

*Primary Examiner*—J. Woodrow Eldred
(74) *Attorney, Agent, or Firm*—Sturm & Fix LLP

(57) ABSTRACT

A pivoting power transmission unit is provided for driving a tiltable rotor of a convertible aircraft. The casing of the pivoting transmission unit comprises a lower casing, by which the casing is able to pivot on a support by two bearings each having a stationary part integral with the support and a swivelling part. The lower casing is assembled to an upper casing in which a drive shaft connected in rotation to gears housed in the casing is mounted so as to rotate about an axis of rotation perpendicular to the pivot axis of the casing. The upper casing is supported by an arrangement configured to transfer to the support via said bearings load/thrust forces experienced by the drive shaft during use.

18 Claims, 5 Drawing Sheets

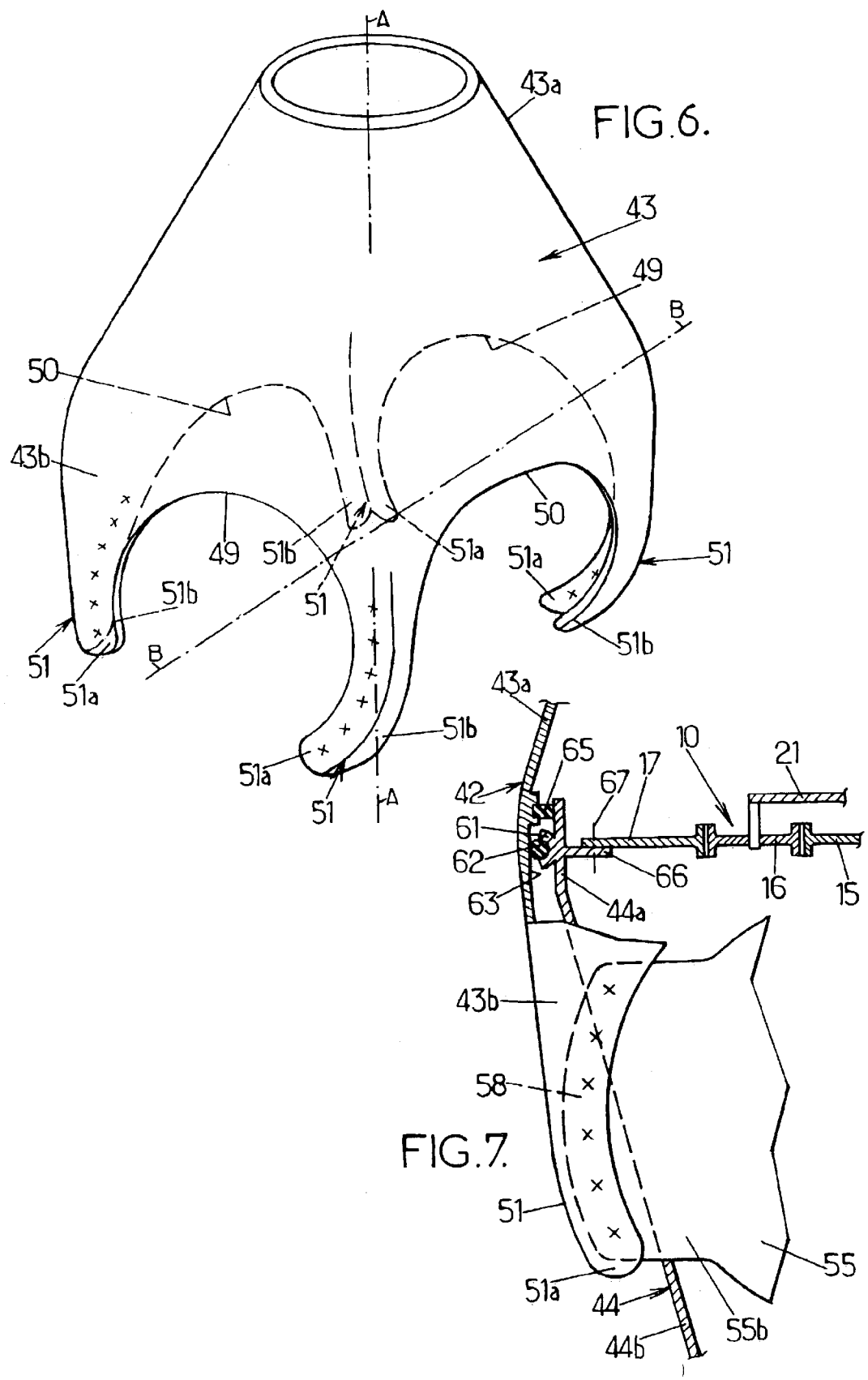

PIVOTING POWER TRANSMISSION UNIT WITH LOAD TRANSFER VIA THE CASING

FIELD OF THE INVENTION

The invention relates to a pivoting power transmission unit, of the type comprising a casing pivoting about a pivot axis on a non-pivoting support, and in which the casing comprises a lower casing, which encloses at least one stage of pinions of the transmission unit, and by which the casing is mounted so as to pivot on the support by two bearings coaxial about the pivot axis and spaced apart from each other along this latter axis, each bearing comprising a stationary part, integral with the support, and a swivelling part, integral with the lower casing, and mounted so as to rotate on the corresponding stationary part about the pivot axis, the casing also comprising an upper casing, assembled to the lower casing, and in which a drive shaft, connected in rotation to said stage of pinions, is mounted so as to rotate about an axis of rotation substantially perpendicular to the pivot axis and pivoting with the casing about the pivot axis, the drive shaft being retained axially by at least one thrust bearing in a part of the upper casing having a generally convergent external shape, which converges towards one end of the drive shaft projecting from the casing and connected in rotation to a rotor.

The pivoting power transmission unit according to the invention may be used, in a non-limiting manner, as a power transmission unit fitted to aircrafts having a swivellable propulsion system, such as dirigible balloons, or again as a power transmission unit fitted to wind turbines.

In general, the pivoting power transmission unit according to the invention can be used in all swivellable propulsion systems or systems generating energy by rotation which, to operate satisfactorily, require good knowledge of the deformation of the casings of the transmission units under load, in order to optimise the bearing surfaces and contact areas on the pinions which are housed in the pivoting casing of the corresponding transmission units.

In particular, as an application for which a pivoting power transmission unit according to the invention is of great relevance for the applicant, such a transmission unit can be used to drive in rotation, from at least one power unit, of the turboshaft engine type, for example, at least one tilting rotor of an aircraft of the convertible type, which can operate in aeroplane or helicopter mode, and in which the rotor drive shaft swivels about a pivot axis so that it can move from one position, in which the rotor operates as an aircraft propeller, for the aircraft to fly in aeroplane mode, to a position in which the rotor operates as a helicopter lift rotor, for the aircraft to fly in helicopter mode.

BACKGROUND TO THE INVENTION

A pivoting power transmission unit of the type presented above is described in particular in patent application FR 01 14392, in an application fitted to a convertible aircraft with tilting rotors, in particular as described in French patents FR 2 791 319 and FR 2 791 634 to which reference should be made for further details.

It is pointed out however that these two patents describe a convertible aircraft with tilting rotors, of the type in which the shaft of each rotor (which is a drive shaft projecting from a pivoting power transmission unit) is driven in rotation about itself by a front reduction gear unit of one respectively of two power transmissions each also comprising a rear reduction gear unit linked to the corresponding front reduction gear unit, and also to one respectively of two engines (turboshafts), each supported by one respectively of the two fixed wings of the aircraft, and to an interconnecting shaft linking the two transmissions for the two rotors to be driven in rotation by any one of the two engines in case of failure of the other engine.

The drive shaft of each rotor, the corresponding power transmission and the corresponding engine are housed in one respectively of two articulated pods, each comprising a front part mounted, so as to pivot about the pivot axis, on a rear part stationary relative to the aircraft, and attached to one respectively of the two wings of the aircraft, and in which are housed the corresponding engine and at least in part the rear reduction gear unit of the corresponding transmission, the front reduction gear unit of which, embodied as a helicopter main gearbox, and also the shaft of the corresponding rotor are housed in the pivoting front part of the pod, and are mounted so as to pivot with this front part relative to the stationary rear part of the pod and the corresponding fixed wing.

On a helicopter, it is known practice to absorb main rotor lift by a set of suspension struts, suspending on the structure of the helicopter a main gearbox mounted between the engine or engines driving the main rotor and the latter, this set of suspension struts comprising at least three and generally four rigid struts, substantially rectilinear, distributed around the main gearbox and inclined towards each other and towards the axis of rotation of the rotor shaft at their upper ends at which the suspension struts are articulated to the upper part of the main gearbox casing, which also comprises a lower part of the casing attached to the upper part of the casing, while the suspension struts are integral with the structure of the helicopter at their lower ends, articulated on fittings integral with the transmission support platform of the structure.

The upper and lower parts of the casing are rigidly assembled to each other by a ring of threaded studs which at the same time secure to the casing an outer peripheral gearwheel of an epicyclic train, constituting an output stage of a pivoting reduction gear unit housed in the casing, and such that the planet gear carrier of the epicyclic train is integral in rotation, about the axis of rotation of the rotor, with the drive shaft mounted rotatably in the upper part of the casing by rolling bearings, including a thrust bearing axially retaining the drive shaft in the upper part of the casing, while the sun gear of the epicyclic train is integral in rotation with a bevel or spiral bevel gear meshed with a bevel or spiral bevel input gear of a pair of bevel gear meshed with a bevel or spiral bevel input gear of a pair of bevel gears, constituting another reduction stage housed in the lower part of the casing, and such that the bevel input gear shaft is driven from the engine or engines.

In an architecture of this type, all the loads and bending moments applied to the top of the shaft driving the rotor pass through all of the gears and other toothed components housed in the casing. The deformation of the casing under these loads must therefore be precisely known, in order that the bearing surfaces and contact areas on the bevel or spiral bevel gears can be optimised.

On a helicopter, this problem can be solved, since the main rotor always occupies the same position.

On the other hand, on a convertible aircraft, each tilting rotor can assume a large number of different positions about the pivot axis, ranging between the aeroplane and helicopter configurations. To each position there corresponds a type of deformation of the toothed components of the transmission stages housed in the casing, and this makes it all the more complicated to optimise the contact areas of these toothed components, and in particular of the bevel or spiral bevel gears.

This disadvantage is encountered on the pivoting power transmission units according to the French patent application and the two French patents cited above.

SUMMARY OF THE INVENTION

The problem addressed by the invention is to remedy this disadvantage and reduce as far as possible the loads and therefore the deformation in the toothed components of the drive train contained in the pivoting power transmission unit, and in such a way as to achieve savings in weight and more economical maintenance.

In accordance with the present invention, there is provided a pivoting power transmission unit, in particular for driving a tiltable rotor of a convertible aircraft, comprising a casing pivoting about a pivot axis on a non-pivoting support, said casing comprising a lower casing, which encloses at least one stage of gears of the transmission unit, and by which said casing is mounted so as to pivot on said support by two bearings coaxial about said pivot axis and spaced apart from each other therealong, each bearing having a stationary part, integral with said support, and a swivelling part, integral with said lower casing, and mounted so as to rotate on said corresponding stationary part about said pivot axis, said casing also comprising an upper casing, assembled to the lower casing, and in which a drive shaft, connected in rotation to said stage of gears, is mounted so that it can rotate about an axis of rotation substantially perpendicular to said pivot axis and pivoting with said casing about said pivot axis, said drive shaft being retained axially by at least one thrust bearing in a part of said upper casing having a generally convergent external shape, which converges towards one end of said drive shaft projecting out of said casing and connected in rotation to a rotor, wherein said upper casing is supported by an arrangement configured to transfer to said support via said pivot bearings at least an axial load experienced by said drive shaft during use.

With this architecture of the power transmission unit, in order to reduce very substantially the loads, and therefore the deformation, in the gears of the drive train enclosed in the pivoting power transmission unit, it is proposed by the invention that the pivoting casing of the power transmission unit of the invention should absorb the lift loads applied to the corresponding rotor, in helicopter mode, and/or the thrust loads applied to the rotor in aeroplane mode, these lift and/or thrust loads corresponding to an axial load on the drive shaft of each rotor, and should transfer them directly to the structure of the convertible aircraft, or more generally, to the structure integral with the support on which the casing of the transmission unit is mounted so as to pivot.

For an application to wind turbines and to convertible aircrafts with tilting rotors, the invention proposes a pivoting power transmission unit the casing of which also transfers the loads due to the moments and efforts applied to the end of the drive shaft connected to the rotor hub, directly to the load-carrying structure and not to the components (gears and gearwheels) constituting the drive train housed in the transmission unit.

In a first mode of embodiment, the arrangement for transferring to the support at least the axial load applied to the drive shaft comprise a set of at least three suspension struts, by which the pivoting casing is suspended on the swivelling parts of the two pivot bearings, the suspension struts being rigid, substantially rectilinear, inclined to the axis of rotation so as to converge towards each other and towards said axis of rotation at their ends facing towards said rotor, and distributed about said axis of rotation, each of said suspension struts being articulated, at a first end, to said convergent part of the upper casing and, at its second end, to one of said swivelling parts of said bearings.

With an embodiment of this kind, the lift loads, in the helicopter configuration, or the thrust loads when the rotor operates as a propeller, in the aeroplane configuration, pass from the drive shaft of the rotor to the non-pivoting support, and therefore to the load-carrying structure, via the swivelling parts of the pivoting bearings, constituting the swivelling link between the power transmission unit and the load-carrying structure, but the shear forces and bending moments applied to the end of the drive shaft connected to the rotor hub always pass through the gearing housed in the transmission unit.

So as not to interfere with the internal arrangement of the transmission unit in its housing, the suspension struts advantageously extend to the outside of said pivoting casing, each one between an attachment projecting outwards on said convergent part of said upper casing, and an articulated attachment on the corresponding swivelling part of a bearing.

In view of the fact that the set of struts suspends the pivoting casing on the swivelling parts of the two pivot bearings, it is advantageous for this set of suspension struts to comprise four struts grouped into two pairs of struts, of which each pair has its two struts articulated to one respectively of the two swivelling bearing parts, each swivelling part comprising two projecting lugs substantially radial relative to the pivot axis and extending either side of a plane passing through the axes of rotation and pivoting, and on each of said lugs one respectively of the two struts of the corresponding pair of struts is articulated, according to an embodiment which is advantageously symmetrical with respect to a plane passing through the axis of rotation and perpendicular to the pivot axis.

Also advantageously, for a better distribution of the loads which pass through the suspension struts and their connections to the swivelling parts of the bearings, the articulation points of two suspension struts on the same swivelling part of a bearing are substantially diametrically opposite relative to the pivot axis, and each suspension strut is articulated at least so as to swivel about an axis perpendicular to a diametral plane passing through the axis of rotation, at each of its two articulated joints.

An embodiment of this type, in which the lift or thrust is passed by the suspension struts and the pivot bearings to the load-carrying structure, means that a rigid assembly of the upper casing to the lower casing is retained and at the same time an attachment provided for a toothed component of the gearing inside the casing, as is known and presented above in helicopter main gearboxes. Thus, in the transmission unit according to the invention, at least one stage of gears of this unit may advantageously be at least partially enclosed by said lower casing and comprise an outer peripheral annular gear, attached to the inside of said lower casing by fasteners of the threaded stud type, making the upper and lower casings integral with each other, particularly when the outer peripheral annular gear is that of an epicyclic train mounted as an output reduction stage for driving the rotor shaft, in the transmission unit according to the invention.

This first embodiment, with suspension struts, requires a relatively long assembly time, as these struts must be perfectly adjusted and the structure as a whole is relatively heavy, due to the weight of the struts and the weight of the attachment lugs of the swivelling parts of the bearings.

To eliminate these disadvantages, and to obtain a transfer of loads which is not limited to lift or thrust, but also involves the moments and shear forces at the top of the drive shaft, the invention proposes a second embodiment of the casing, wherein the arrangement for transferring to the support at least the axial load applied to the drive shaft comprises a skirt extending from the upper casing at one end opposite to the rotor and outside said lower casing, the skirt having at least two cylindrical arc-shaped portions, coaxial about said pivot axis and each attached to one respectively of the swivelling parts of the bearings, said upper casing being mounted on said lower casing by a swivel coupling for swivelling about a part of said lower casing defining its maximum cross-section, perpendicularly to said axis of rotation, said lower casing being also attached to said swivelling parts of the bearings.

This architecture provides decoupling between the upper casing and the lower casing, as the upper casing is no longer rigidly assembled to the lower casing in the area of maximum cross-section of the latter, but is able on the contrary to swivel with limited amplitude on the lower casing, which is still attached to the swivelling parts of the bearings, to which the skirt of the upper casing is itself attached by its cylindrical arc-shaped portions, through which the shear forces and bending moments pass, thus transferred directly by the upper casing and its skirt to the swivelling parts of the bearings, and therefore to the stationary parts of said bearings, and thus to the non-pivoting support and to the load-carrying structure, without passing through the gearing inside the casing.

Thus, by its structure and shape, the upper casing, with its convergent part extended by its skirt around the lower casing, incorporates the functions performed in the previous mode of embodiment by the suspension struts, and fulfils the additional function of transferring directly to the structure the loads coming from the rotor drive shaft. In this way, all the loads applied to the rotor shaft now do not pass through the gearing contained in the transmission unit casing, which considerably reduces the deformation of the toothed components of this gearing, so that it is far easier to optimise the bearing surfaces of the teeth.

In addition to the considerable reduction in the loads, and therefore in the deformation in the drive train housed in the power transmission unit, the lower casing of this unit absorbs torque only, while the upper casing, which transfers the loads, is nevertheless still lighter than the upper casing associated with the set of suspension struts and the attachment lugs on the swivelling parts of the bearings in the first mode of embodiment cited above.

Advantageously, in the second mode of embodiment, said swivel coupling comprise a flexible peripheral sealing ring e.g. an O-ring, fitted into an annular groove open radially towards the outside and made in said lower casing about its part with the largest outside diameter, and said flexible sealing ring is held in contact with said upper casing, against a cylindrical annular seating of circular cross-section, perpendicularly to said axis of rotation, delimited, radially towards the outside of the flexible sealing ring relative to the axis of rotation, by the inner face of said upper casing.

By its flexibility, the sealing ring allows the upper casing to swivel slightly on the lower casing.

In addition, said swivel coupling may at the same time substantially provide sealing between said upper and lower casings, which is the case with the sealing ring cited above.

In a preferred form of embodiment, said upper casing skirt may comprise four coaxial cylindrical arc-shaped portions, forming two pairs of curved feet facing each other, and such that for each pair, the two corresponding feet are attached to said swivelling part of one respectively of the two bearings, either side of a plane passing through the axes of rotation and pivoting.

Thus the upper casing may have a general shape highly favourable to the transfer of said loads and to its cooperation with the lower casing, insofar as its convergent part may have an overall truncated cone shape, the circular cross-section of which, at the rotor end, changes progressively in the skirt to a substantially square cross-section with corners and/or sides rounded and curving outwards, the skirt of the upper casing thus having substantially a general outer form of an inverted truncated pyramid, of which the end turned towards the pivot axis terminates, as presented above, in the four curved feet, which may be attached to the swivelling parts of the bearings to transfer shear forces and bending moments.

To this end, each cylindrical arc-shaped foot is preferably attached to the corresponding swivelling part by a set of fasteners, such as threaded studs or screws, distributed along said foot and over a portion of the periphery of said swivelling part.

In order that these feet may have sufficient stiffness, they are advantageously given a cross-section in the form of an angle section with two flanges substantially at right angles, so that each cylindrical arc-shaped foot may advantageously have, on one of the flanges, an attachment face which is turned towards the outside of said skirt and in the form substantially of a portion of annular ring radial relative to the pivot axis and coaxial about said pivot axis, and by which said foot is attached by said set of fastenings, aligned substantially along the pivot axis, to the corresponding swivelling part.

Moreover, to allow advantageously each swivelling part of a bearing to be connected, on the one hand, to the corresponding two feet of the upper casing skirt and, on the other, to the lower casing, each swivelling part advantageously comprises a sleeve capable of rotating about the corresponding stationary part of the corresponding bearing, and supporting an attachment flange, projecting radially outwards relative to the pivot axis, by which said swivelling part is, on the one hand, bearing against and attached by a ring of fasteners, such as threaded studs or screws, against one respectively of two annular rings, delimited in diametrically opposite positions relative to the axis of rotation by said lower casing and radial and coaxial about the pivot axis, to attach said swivelling part to said lower casing and, on the other, bearing against and attached by each of the two sets of fasteners against each one respectively of the feet of one respectively of said pairs of feet of said skirt, to attach said swivelling part to said upper casing, radially outside the fasteners to said lower casing.

In this second embodiment, because of the swivelling of the upper casing on the lower casing, when the latter encloses an outer peripheral annular gear of a stage of gears of the transmission unit, said annular gear is attached by a set of threaded fasteners to said lower casing, without being attached to said upper casing.

It is thus possible to retain the architecture of the reduction gear assembly housed in the lower casing, with two stages, the first or input stage of which comprises a pair of bevel or spiral-bevel gears, the input bevel gear of which is driven in rotation by its shaft about the pivot axis, while the output bevel or spiral-bevel gear of this first stage is connected in rotation to the sun gear of the second stage, embodied in the form of an epicyclic stage of which the outer peripheral gearwheel is made integral with the lower casing only, as indicated above.

In the two modes of embodiment cited above, the convergent part of the upper casing, in a form of embodiment which may be advantageous for the aerodynamic shaping of the casing and of the corresponding engine pod, may be a substantially truncated cone-shaped section of casing or, as a variant, a section of casing in the form substantially of a truncated pyramid with a cross-section, perpendicularly to said axis of rotation, which is substantially quadrangular, with sides and/or corners rounded with the concave faces turned towards the axis of rotation, as is advantageously also the case with the skirt of the upper casing, in the second mode of embodiment.

In accordance with the present invention, there is also provided a convertible aircraft comprising at least one tilting rotor moveable from a first position in which the at least one tilting rotor operates as an aeroplane propeller to a second position in which the at least one tilting rotor operates as a helicopter main lifting rotor, comprising a pivoting power transmission unit as hereinbefore defined.

BRIEF DESCRIPTION OF THE DRAWINGS

Other characteristics and advantages of the invention will become clear from the description given below, in a non-limiting manner, of examples of embodiments described with reference to the appended drawings in which:

FIG. 6 is a view similar to FIG. 5 of the upper casing of the transmission unit in FIG. 3, and FIG. 7 is a partial schematic representation of the transmission unit in FIGS. 3 to 6.

DETAILED DESCRIPTION OF SPECIFIC EMBODIMENTS

Figure 1:
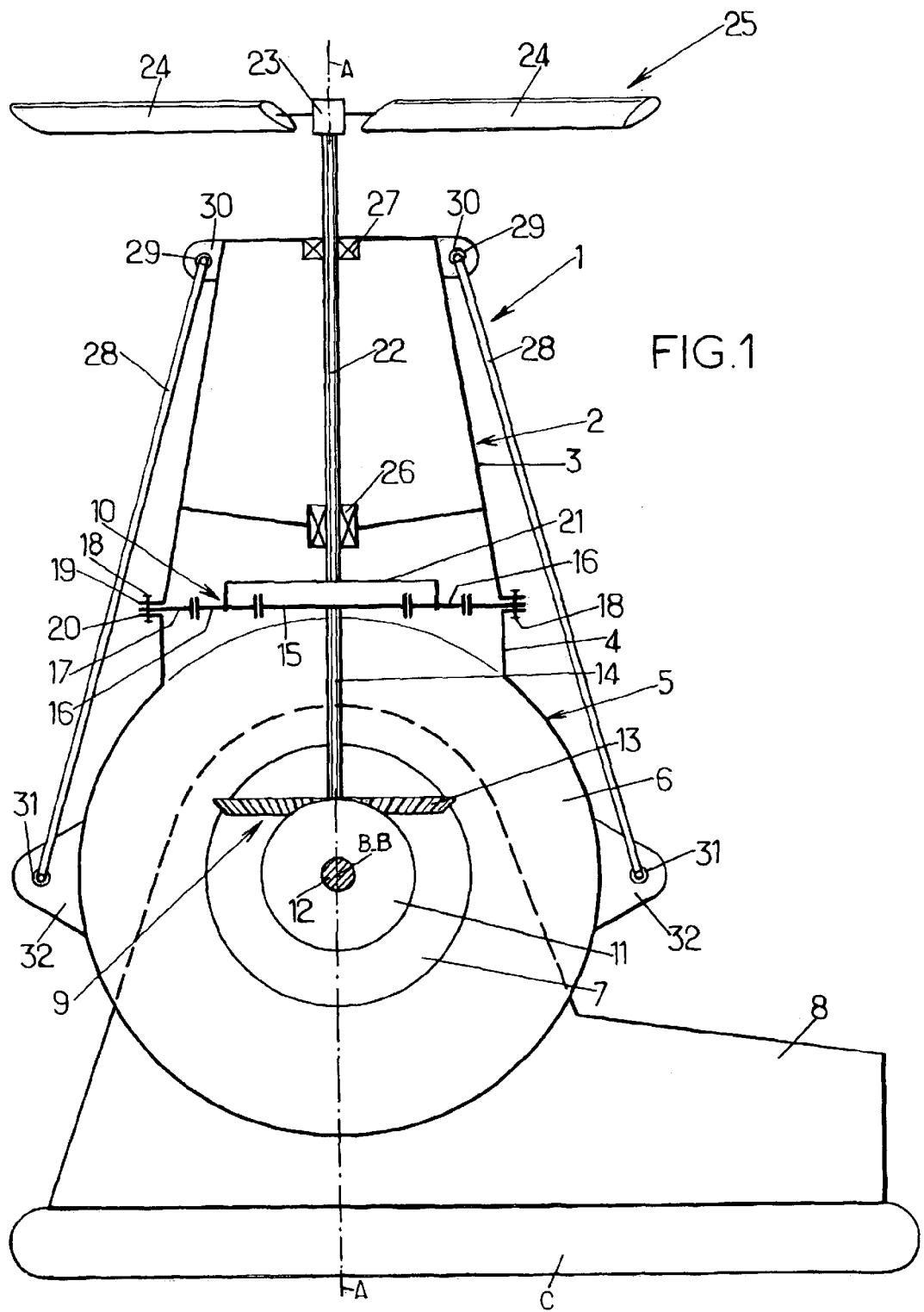
FIG. 1 represents schematically, partly in side elevation and partly in axial cross-section, an example of a pivoting power transmission unit equipped with suspension struts, for driving in rotation a convertible aircraft tilting rotor, the transmission unit being shown in the helicopter configuration.
Figure 2:
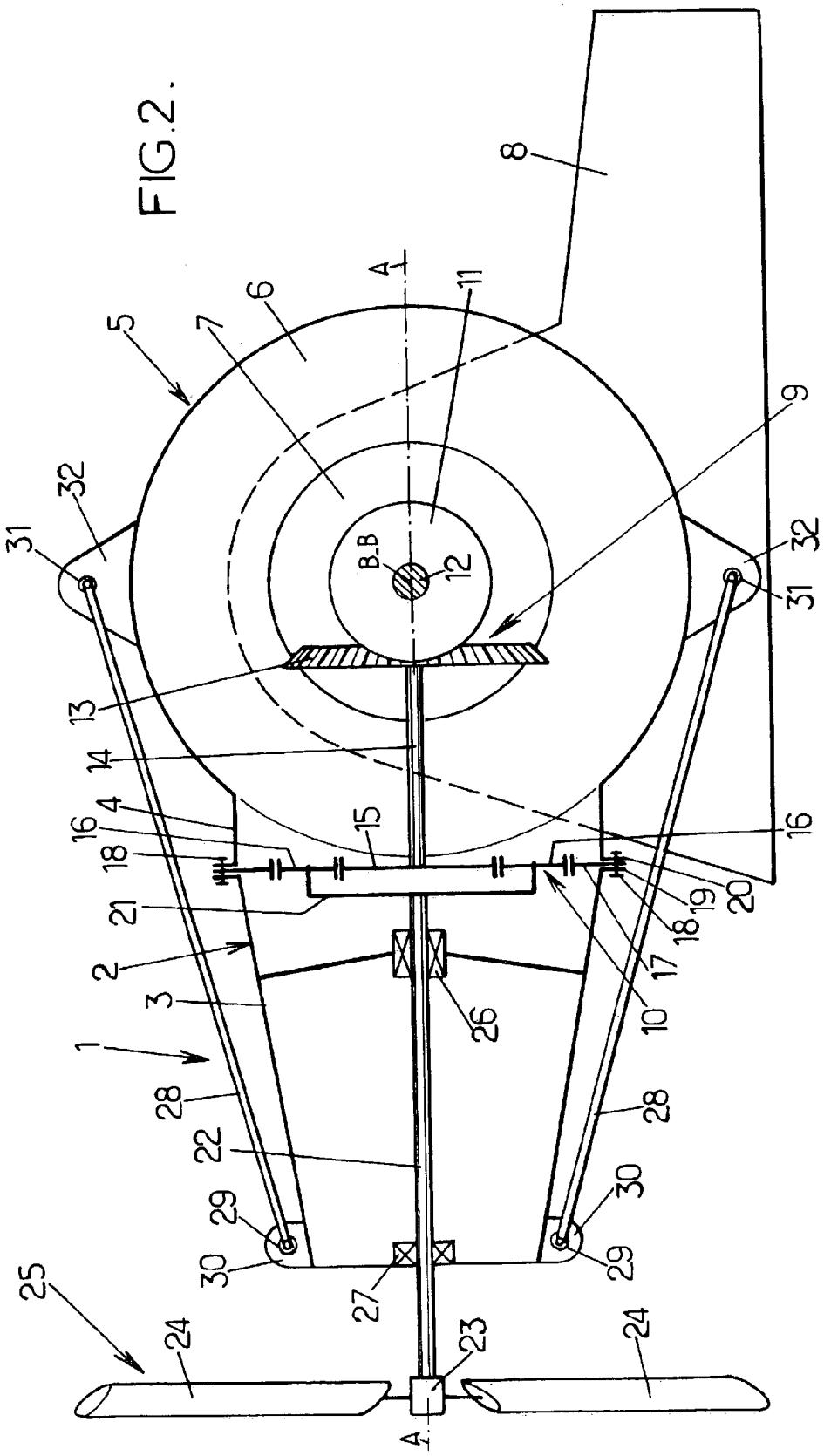
FIG. 2 is a view similar to FIG. 1 showing the pivoting power transmission unit in the aeroplane configuration.

In the example in FIGS. 1 and 2, the pivoting power transmission unit 1, for driving a tilting rotor of a convertible aircraft (shown schematically as C in FIG. 1), comprises a casing 2 consisting essentially of the assembly of two parts to each other, these being an upper casing 3 and a lower casing 4, by which the whole of the casing 2, and therefore of the transmission unit 1 is mounted so as to pivot about a pivot axis B—B (perpendicular to the plane of FIGS. 1 and 2) by two pivot bearings, spaced apart from each other axially along the axis B—B, only one of which is shown schematically as 5.

Each bearing 5 comprises a revolving part 6 fitted so as to rotate about a stationary cylindrical part 7, coaxial with the stationary part 7 of the other bearing 5, and integral with a non-pivoting rigid support 8 attached to the structure of the rear part of a corresponding engine pod and to the structure of a fixed wing of the convertible aircraft, as described in the patents cited above.

The lower casing 4 is arranged axially between the two revolving parts 6 of the coaxial bearings 5 and made integral, for example by bolting, with these revolving parts 6, for the casing 2 to be mounted so as to swivel on the support 8 about the pivot axis B—B.

The pivoting casing 2 houses a reduction gear unit of the pivoting transmission unit 1, and this reduction gear unit is shown in FIGS. 1 and 2, as consisting in a known manner, of an input module or stage 9 and an output module or stage 10, the first of which is fitted entirely in the lower casing 4 and the second partly in the lower casing 4 and partly in the upper casing 3, in the area where these two parts 3 and 4 of the casing 2 are connected.

The input stage 9 consists of a pair of bevel or spiral-bevel gears comprising an input gear 11, driven in rotation about the pivot axis B—B by a drive shaft 12 coaxial with the gear 11 about the axis B—B and by a bevel gear 13, meshed with the gear 11, and integral in rotation with a transmission shaft 14, about an axis of rotation perpendicular to the axis B—B.

The output stage 10 is an epicyclic stage, a sun gear 15 of which is integral in coaxial rotation with the shaft 14, about the axis of the latter, and meshed with the planet gears 16, also meshed with the internal teeth of an outer peripheral annular gear 17, made integral with the casing 2 by a ring of fasteners 18, such as screws or bolts, which rigidly attach together the two attachment flanges facing each other, between which extends the outer radial periphery of the annular gear 17, and which are made, one 19 on the base of the upper casing 3 facing towards the lower casing 4, and the other 20 on the edge of the lower casing 4 which faces towards the upper casing 3. These fastenings 18 thus at the same time rigidly attach, by the flanges 19 and 20, the upper casing 3 to the lower casing 4, and rigidly attach the outer annular gear 17 of the epicyclic stage 10 in the casing 2. The stage 10 also comprises a planet gear carrier 21, integral in rotation with the base of a drive shaft 22, or rotor mast, of which the opposite end to the base is integral in rotation with the hub 23 connected to the blades 24 of a rotor 25 thus mounted so as to pivot with the transmission unit 1 about the pivot axis B—B. The rotor mast 22 is guided in rotation about its axis, in an extension of the axis of the shaft 14, and inside the upper casing 3, by rolling bearings 26 and 27, one of which 27, at the end of the upper casing 3 located at the end carrying the rotor 25, is a thrust bearing, absorbing the axial loads applied to the mast 22, due to the lift on the blades 24 of the rotor 25, in the helicopter configuration (FIG. 1), or to the thrust applied by the rotor 25 operating as a propeller, in the aeroplane configuration (FIG. 2) and transferring these axial loads to the upper casing 3.

The rotor 25 is therefore able to rotate about an axis of rotation A—A, which is the axis common to the drive shafts 14 and 22, and therefore substantially perpendicular to the pivot axis B—B, and pivots with the casing 2 about this latter axis. The rotor mast 22 is thus mounted to rotate and be retained axially in the upper casing 3, having the general outer shape of a truncated cone, which converges towards the free end of the rotor mast 22, projecting out of the casing 2 and connected to the rotor 25.

In order that the lift and thrust loads applied to the rotor mast 22 do not pass through the assembly of gears and gearwheels of the reduction gear unit housed in the transmission unit 1, the upper casing 3 cooperates with an arrangement for transferring these loads to the support 8, via the pivoting bearings 5, and in the example in FIGS. 1 and 2, these transfer means comprise essentially a set of four rigid struts 28 for suspension of the pivoting casing 2 on the swivelling parts 6 of the two pivot bearings 5, two suspension struts 28 only being shown in FIGS. 1 and 2.

These struts 28, two of which are located on the same side as one of the bearings 5, and the other two on the same side as the other bearing 5, are substantially rectilinear struts, inclined to the axis of rotation A—A of the rotor 25, so as to converge towards each other and towards this axis A—A at their ends facing towards the rotor 25, and these four struts 28 are distributed about the axis of rotation A—A and each articulated, by a swivel end 29 at a first end, to lugs 30 attached, projecting radially (relative to the axis A—A) towards the outside at the end of the upper casing 3 located at the same end as the rotor 25, and by another swivel end 31 at its other end, to one of two attachment lugs 32 projecting radially outwards on the rotating part 6 of the corresponding pivot bearing 5, these two lugs 32 being symmetrical with each other relative to the plane defined by the two axes A—A and B—B, and these two lugs 32 being preferably diametrically opposite relative to the pivot axis B—B.

The suspension struts 28 thus extend outside the pivoting casing 2, each between an attachment projecting outwards and defined by one or two corresponding attachment lugs 30 on the narrow end of the upper casing 3, towards the rotor 5, and an articulated attachment on the swivelling part 6 of the corresponding bearing 5, by the corresponding lug 32, which may where appropriate be double or take the form of a yoke in which the swivel of the corresponding end fitting of the strut 28 is retained.

This assembly ensures that the articulation points of the struts 28 of each of the two pairs of struts associated respectively with the swivelling part 6 of one respectively of the bearings 5 are substantially diametrically opposite relative to the pivot axis B—B.

Because it is connected to the attachment lugs 30 and 32 by the swivel ends 29 and 31 respectively, each suspension strut 28 is articulated at least so that it can swivel about an axis which is perpendicular to the local diametral plane passing through the axis of rotation A—A of the rotor 25 and through the centre of the swivel at each of the two articulations at the swivel ends 29 and 31.

With an embodiment of this type, the thrust or lift loads applied to the rotor mast 22 are introduced, via the thrust bearing 27, into the narrowest part of the upper casing 3, which carries the attachment lugs 30, by which these loads are introduced into the suspension struts 28 and transmitted, via the lugs 32, to the swivelling parts 6 of the two pivot bearings 5, of which the stationary parts 7, on which the swivelling parts 6 are able to rotate, transmit these loads to the support 8 and therefore to the load-carrying structure.

On the other hand, the shear forces and bending moments applied at the top of the rotor mast 22 always pass through the gears and gearwheels of the reduction gear stages of the pivoting transmission unit 1.

The second example of a pivoting power transmission unit, shown in FIGS. 3 to 7, not only ensures that the lift and thrust loads are not made to pass through the gears and gearwheels of the transmission stages of the pivoting power transmission unit, but also secures the same advantage for moments and shear forces, applied at the head of the rotor mast, and which are transmitted, as is the lift or the thrust, to the structure by transfer means cooperating with the upper casing, though without including suspension struts, and therefore without incurring penalties in weight because of the presence of the suspension struts and also of the attachment lugs, and in assembly times, due to the fact that such suspension struts must be perfectly adjusted in length.

The pivoting transmission unit 41 in FIGS. 3 to 7, which also includes a reduction gear assembly consisting, as in the example in FIGS. 1 and 2, of a bevel or spiral bevel gear input module or stage 9 with the bevel or spiral-bevel gears and an output module or stage 10 which is an epicyclic stage (so that the components of this reduction gear unit are referred to in FIGS. 3 to 7 by the same reference numbers as in FIGS. 1 and 2), also comprises a casing 42 consisting essentially of an upper casing 43 assembled to a lower casing 44.

Figure 3:
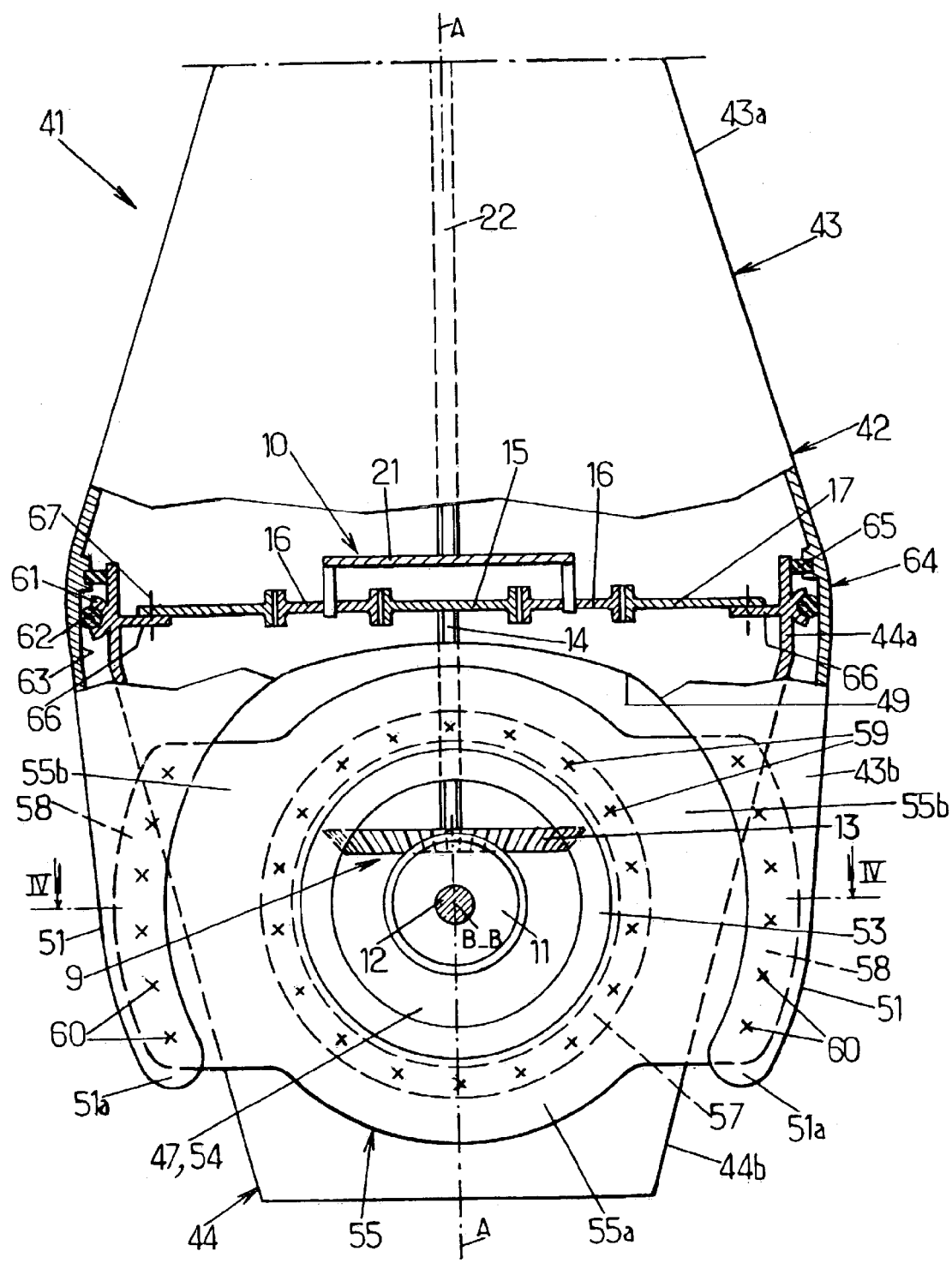
FIG. 3 is a schematic representation of a second example of a pivoting power transmission unit, with no suspension struts, also for fitting to a tilt rotor convertible aircraft.
Figure 4:
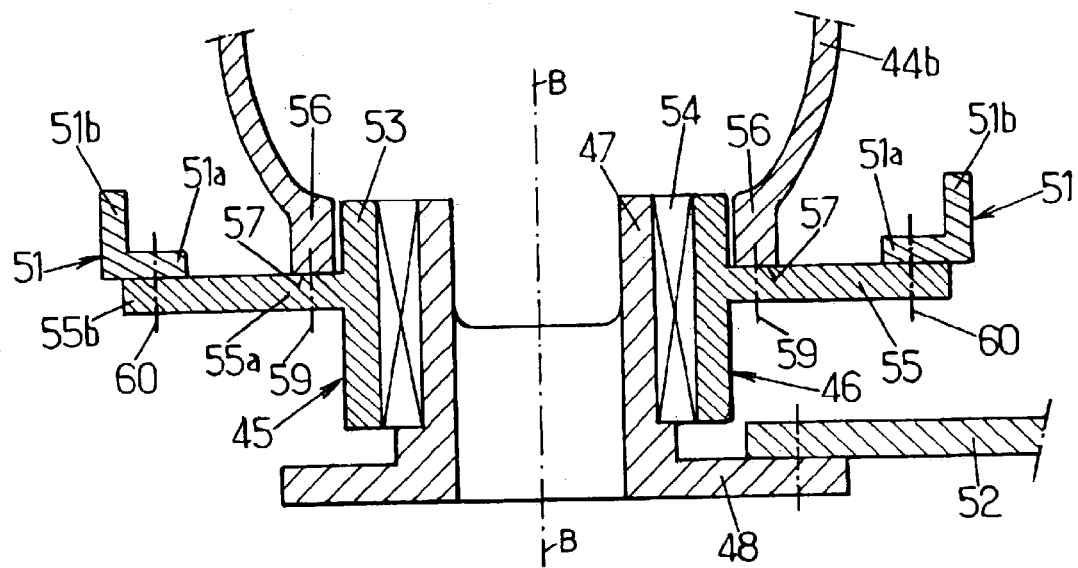
FIG. 4 is a view in section along IV—IV in FIG. 3.
Figure 5:
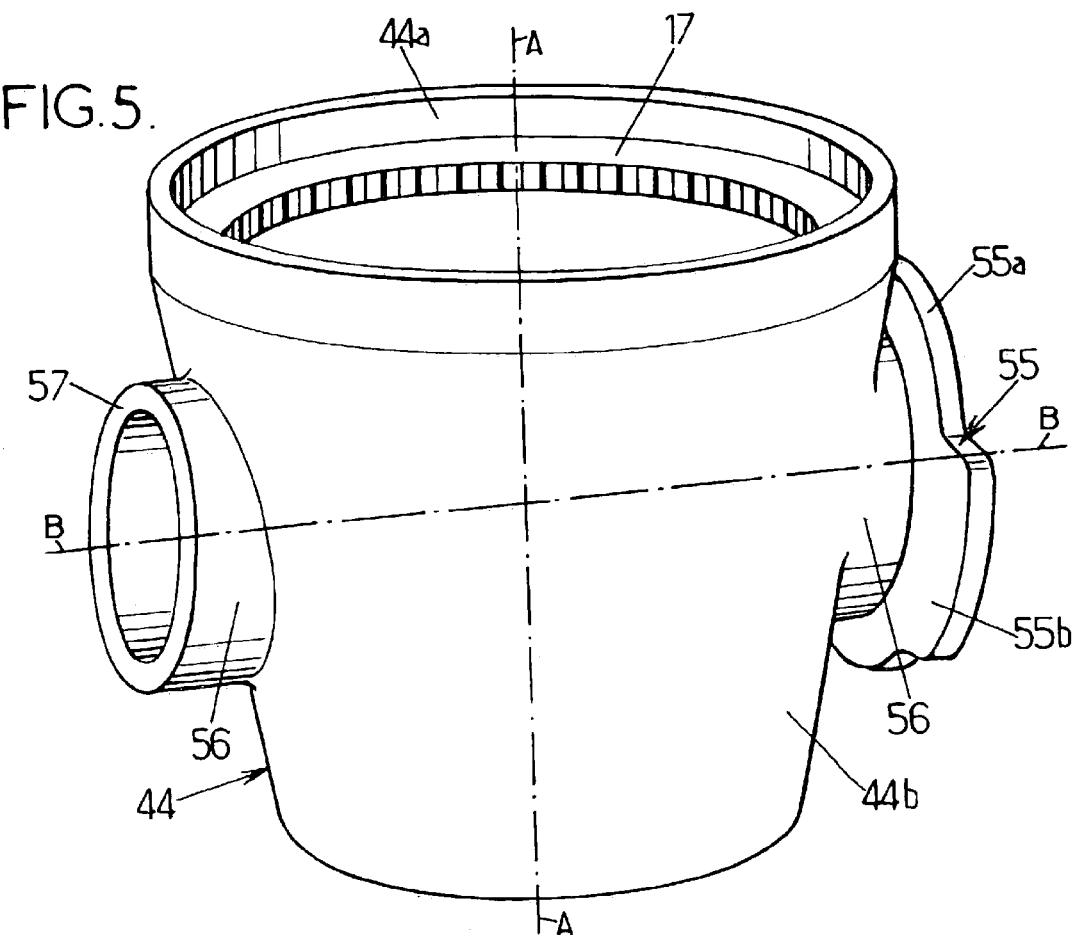
FIG. 5 is a schematic view in perspective of the lower casing of the transmission unit in FIG. 3.

As can be seen in FIGS. 3, 5 and 7, the lower casing 44 has a generally cylindrical-conical external shape, with an open cylindrical end part 44a, facing towards the upper casing 43 and towards the rotor, not shown in FIGS. 3 to 7, but constituted as in FIGS. 1 and 2 and driven in rotation by the drive shaft or rotor mast 22 integral in rotation with the planet gear carrier 21 of the epicyclic output stage 10. This open cylindrical end part 44a of the lower casing 44 is extended, at the opposite end to the rotor, that is to say downwards in FIGS. 3, 5 and 7, by a truncated cone-shaped part 44b converging at the opposite end to the rotor.

It should be noted that, in the example in FIGS. 1 and 2, the lower casing 4 may have the same shape as the lower casing 44 in FIGS. 3 to 7.

On the other hand, in the example in FIGS. 3 to 7, the upper casing 43 not only includes a part 43a converging towards the rotor, and therefore at the opposite end to the lower casing 44, and which in this example is a truncated cone-shaped convergent part 43a (see FIG. 6), as in the example in FIGS. 1 and 2, but also a skirt 43b, which extends the truncated cone-shaped part 43a of the upper casing 43 at the opposite end to the rotor and on the outside of the lower casing 44. As shown in FIGS. 3, 6 and 7, the skirt 43b, which extends the upper casing 43 around the lower casing 44, has a generally convergent shape at the opposite end to the rotor and substantially in the form of a truncated inverted pyramid, of quadrangular cross-section, substantially square, with slightly rounded sides with the concave faces turned towards the axis of the upper casing 43, which corresponds substantially to the axis of rotation A—A. As can be seen in FIG. 6, there are four cut away areas, each made in one respectively of the four faces of the overall truncated pyramid shape of the skirt 43b, two of these cut away areas, diametrically opposite relative to the axis A—A, defining two cylindrical arc-shaped portions 49 coaxial about the pivot axis B—B (see FIG. 3) and these cutaway areas in the form of portions of cylindrical arcs 49 form the boundaries at the bottom of the skirt 43b, with the other two cutaway areas 50 formed in the latter, of four feet 51 curved and each having a cross-section substantially of an angle section with two flanges substantially perpendicular to each other, one of which 51a is a flange substantially radial relative to the pivot axis B—B, and the other 51b is a stiffening flange (see FIGS. 4 and 6).

Thus, the skirt 43b of the upper casing 43 has four feet 51 forming two pairs of feet, of which the two feet 51 of each pair are curved towards each other, and the feet 51 have on the outer face (relative to the axis of rotation A—A) of their radial flange 51a an arc-shaped portion coaxial about the pivot axis B—B, delimiting with the outer face of the flange 51a of the curved foot 51 opposite a portion of annular ring, substantially radial relative to the pivot axis B—B, and coaxial about the latter, which acts as a face for attaching the skirt 43b of the upper casing 43 to a swivelling part of one respectively of the two pivot bearings such as 45, in FIG. 4, between which and by which the casing 42 of the pivoting power transmission unit 41 is mounted so as to swivel about the pivot axis B—B.

As for the example in FIGS. 1 and 2, FIG. 4 shows that each pivot bearing 45 comprises a swivelling part 46, which revolves, about the pivot axis B—B, on a stationary part 47 integral with a non-pivoting support 48 made integral, for example by bolting, with the structure 52 of an engine pod of the convertible aircraft. Each swivelling part 46 comprises a cylindrical sleeve 53 of circular cross-section, coaxial with the pivot axis B—B, and which is free to rotate about a coaxial cylindrical sleeve of the corresponding stationary part 47 of the corresponding bearing 45, with a wear ring 54 inserted between the swivelling part 46 and stationary part 47 when the bearing 45 is plain, or rolling elements such as rollers or needles, when the bearing 45 is a rolling bearing. The sleeve 53 of the swivelling part 46 supports a radial flange 55 relative to the pivot axis B—B, and projecting towards the outside of the sleeve 53, to allow the swivelling part 46, on the one hand, to be attached against the outer face, relative to the axis of the upper casing 43, of the radial flange 51a of each of the two curved feet 51 facing each other and on the same side as the corresponding bearing 45 and, on the other, to the truncated cone-shaped part 44b of the lower casing 44.

To this end, and as shown in FIG. 5, this truncated cone-shaped part 44b of the lower casing 44 has two portions of cylindrical sleeves 56 of circular cross-section, diametrically opposite and coaxial about the pivot axis B—B, and projecting radially towards the outside of the truncated cone-shaped part 44b, so that-on the one hand, the sleeve 53 of each swivelling part 46 of a bearing 45 is fitted (along the axis B—B) into one respectively of the portions of sleeve 56 on the lower casing 44 and, on the other, each portion of sleeve 56 has at its outer radial end a flat annular surface 57, radial relative to the axis B—B, and forming a face for attaching the lower casing 44 to the swivelling part 46 of one respectively of the two pivot bearings 45.

To make it easier to attach each swivelling part 46, on the one hand, against the annular face 57 of one respectively of the portions of sleeve 56 on the lower casing 44 and on the other against the radial flanges 51a of the corresponding two feet 51 of the skirt 43b of the upper casing 43, and symmetrically either side of the plane passing through the axes of rotation A—A and of pivoting B—B, the attachment flange 55 of each swivelling part 46 has the shape showing in FIGS. 3, 5 and 7 of a central annular ring 55a of circular cross-section, extended radially outwards by two diametrically opposite flange extensions 55b, which extend over a circular sector sufficiently large for each flange 55b to delimit by being superimposed on the corresponding flange 51a, an attachment surface 58 (see FIGS. 3 and 7) in the form of an arc of annular ring coaxial about the axis B—B and of sufficient size.

Thus, as shown in FIGS. 3 and 4, the attachment flange extension 55 of the swivelling part 46 of each bearing 45 is attached to the lower casing 44 by its central annular ring 55a, which bears against and is attached against the annular end face 57 of one of the portions of sleeve 56 on the lower casing 44 by a set of threaded components 59 such as studs or screws, arranged in a ring and aligned parallel to the axis B—B and each marked schematically by a cross in FIG. 3 and by its axis in FIG. 4. Radially outside this ring of fasteners 59, the attachment flange 55 of the swivelling part 46 of each bearing 45 also bears against and is attached to the radial flange 51a of each of the corresponding two feet 51 of the upper casing 43 by one respectively of the two outer radial flange extensions 55b of this flange 55, by means of a set of other threaded fasteners 60, also marked by crosses in FIG. 3 and by their axes in FIG. 4, these threaded components 60 being distributed over the area 58 cited above in the form of an arc of circular ring which extends concentrically about the pivot axis B—B and defined by being superimposed on the radial flange 51a of the corresponding foot 51.

The cylindrical end part 44a of the lower casing 44, which is the part of this lower casing 44 having the largest cross-section (perpendicularly to the axis A—A) and therefore the largest diameter, has running around it an annular groove 61, open radially towards the outside of the lower casing 44 and with an arc of circle cross-section with the concave side facing radially outwards, in which is fitted a flexible peripheral seal 62, in the form of an O-ring, held in contact by its outer radial periphery against a cylindrical annular seating 63, of circular cross-section (perpendicularly to the axis of rotation A—A and of the upper casing 43), machined on the inner face of the part of the upper casing 43 having the largest diameter, at the junction between the convergent part 43a and the skirt 43b.

The flexible O-ring 62, held between the groove 61 and the seating 63, constitutes swivelling couplings 64, decoupling the upper casing 43 from the lower casing 44 at the maximum cross-section of the casing 42 (perpendicularly to its axis A—A) by allowing, because of its flexibility and limited deformation, limited swivelling of the upper casing 43 on the lower casing 44, between which sealing is provided at the same time by this seal 62, which protects the inside of the casing 42 from the ingress of foreign objects finding their way in between the skirt 43b and the lower casing 44.

This sealing may be improved by arranging an annular seal 65 (see FIGS. 3 and 7) held by its outer radial periphery in a groove made in the inner wall of the upper casing 43 on one side of the seating 63, and which has its inner radial periphery placed against the outer face of the open cylindrical end part 44a of the lower casing 44. This cylindrical part 44a of the lower casing 44 also has an internal and annular radial flange 66 to which is attached the outer peripheral annular gear 17 of the epicyclic output reduction gear stage 10, by a set of threaded fasteners, such as studs or screws, marked by their axes 67, so that this peripheral annular gear 17 is attached to and enclosed by this end part 44a of the lower casing 44 without being attached to the upper casing 43.

This flexible peripheral swivelling seal 62, shown in FIGS. 3 and 7, allows limited-amplitude swivelling movements of the upper casing 43 on the lower casing 44, so as to avoid any unwanted loads or moments being introduced into the power train constituted by the stages of gears and toothed components housed in the casing 42. The shear forces and bending moments originating from the rotor mast 22 pass through the structure of the upper casing 43, by reason of at least one rolling thrust bearing guiding the mast 22 in the upper end of the upper casing 43, as in the example in FIGS. 1 and 2, then these loads and moments are transmitted to the swivelling parts 46 of the pivot bearings 45, and finally to the non-pivoting support 48 and the stationary structure 52, without affecting the lower casing 44 nor the gearing housed in the casing 42.

Only the reaction torque to the drive torque is transferred to the lower casing 44, by reason of the attachment of the outer annular gear 17 of the epicyclic stage 10 to the lower casing 44 only. The lower part of the skirt 43b of the upper casing 43, in particular the four feet 51, because of their shape, incorporate the functions of the suspension struts described in the example in FIGS. 1 and 2. The loads coming from the rotor mast 22 are transmitted directly to the structure 52, without passing through the gearing housed in the transmission unit 41, which considerably reduces the deformation of the gears and toothed components of this assembly. This makes it correspondingly easier to optimise the contact surfaces of the teeth. The shear forces and bending moments between the feet 51 of the upper casing 43 and the swivelling parts 46 of the bearings 45 pass through the fasteners 60, while the upper casing 43 is no longer attached to the lower casing 44 in the area of the stationary peripheral annular gear 17 of the epicyclic stage 10, and is able on the contrary to swivel on the lower casing 44 by reason of the flexible peripheral seal 62, also fulfilling a sealing function.

In addition to the advantages presented above, the upper casing 43 of this example of embodiment is lighter than the upper casing 3 associated with the suspension struts and attachment lugs of the example in FIGS. 1 and 2. To this weight saving is added a saving in maintenance.

As a variant, in the two examples of embodiment, the convergent part, such as 43a in FIGS. 3 to 7 of the upper casing 3 or 43 may be a section of casing in the form substantially of a truncated pyramid having a cross-section, perpendicularly to the axis of rotation A—A, which is substantially quadrangular, and preferably substantially square, with rounded sides and/or corners and with the concave faces turned towards the axis of rotation A—A.

The invention has now been described in detail for the purposes of clarity of understanding. It will, however, be appreciated that certain changes and modifications may be practised within the scope of the appended claims.

What is claimed is:

1. A pivoting power transmission unit for driving a rotor, comprising a casing pivoting about a pivot axis on a non-pivoting support, said casing comprising a lower-casing, which encloses at least one stage of gears of the transmission unit, and by which said casing is mounted so as to pivot on said support by two bearings coaxial about said pivot axis and spaced apart from each other therealong, each bearing having a stationary part, integral with said support, and a swivelling part, integral with said lower casing, and mounted so as to rotate on said corresponding stationary part about said pivot axis, said casing also comprising an upper casing, assembled to the lower casing, and in which a drive shaft, connected in rotation to said stage of gears, is mounted so that it can rotate about an axis of rotation substantially perpendicular to said pivot axis and pivoting with said casing about said pivot axis, said drive shaft being retained axially by at least one thrust bearing in a part of said upper casing having a generally convergent external shape, which converges towards one end of said drive shaft projecting out of said casing and connected in rotation to said rotor, wherein said upper casing cooperates with an arrangement configured to transfer to said support via said pivot bearings at least an axial load experienced by said drive shaft during use, said arrangement extending outside said pivoting casing.

2. A pivoting power transmission unit according to claim 1, wherein the arrangement comprises a set of at least three suspension struts coupling said pivoting casing to the swivelling parts of the said two pivot bearings, the suspension struts being rigid, substantially rectilinear, inclined to said axis of rotation so as to converge towards each other and towards said axis of rotation at their ends turned towards said rotor, and distributed about said axis of rotation, with each of said suspension struts being articulated, at a first end to the said convergent part of the upper casing, and, at its second end to one of said swivelling parts of said bearings.

3. A pivoting power transmission unit according to claim 2, wherein each suspension struts extend between an attachment projecting outwards on said convergent part of said upper casing and an articulated attachment on the corresponding swivelling part of said bearing.

4. A pivoting power transmission unit according to claim 2, wherein said set of suspension struts comprises four struts grouped in two pairs of trusts, each pair of which has its two struts articulated to one respectively of the two swivelling parts of said bearings, each swivelling part having two lugs projecting substantially radially relative to the pivot axis and extending either side of a plane passing-through the axes of rotation and of pivoting, and on each of said lugs there is articulated one respectively of the two struts of the corresponding pair of struts.

5. A pivoting power transmission unit according to claim 4, wherein articulation points of two suspension struts on the same swivelling part of a bearing are substantially diametrically opposite relative to said pivot axis.

6. A pivoting power transmission unit according to claim 2, wherein each suspension strut is articulated at least so as to swivel about an axis perpendicular to a diametral plane passing through said axis of rotation, at each of its two articulated joints.

7. A pivoting power transmission unit according to claim 2, wherein at least one stage of gears of the transmission unit is at least partially enclosed by said lower casing and has an external peripheral annular gear, attached inside said lower casing by fasteners, making the upper and lower casings integral with each other.

8. A pivoting power transmission unit according to claim 1, wherein the arrangement comprises a skirt extending from the upper casing at one end opposite to the rotor and outside said lower casing, the skirt having at least two cylindrical arc-shaped portions, coaxial about said pivot axis and each attached to one respectively of the swivelling parts of the bearings, said upper casing being mounted on said lower casing by a swivel coupling allowing it to swivel about a part of said lower casing defining its maximum cross-section, perpendicularly to said axis of rotation, said lower casing being also attached to said swivelling parts of the bearings.

9. A pivoting power transmission unit according to the claim 8, wherein said swivel coupling comprise a flexible peripheral sealing ring, fitted in an annular groove open radially towards the outside and made in said lower casing, about it part of greatest outside diameter, and said flexible sealing ring is kept in contact with said upper casing against an annular seating, cylindrical and of circular cross-section, perpendicularly to the said axis of rotation, delimited, radially towards the outside of the flexible sealing ring relative to said axis of rotation, by the inner face of said upper casing.

10. A pivoting power transmission unit according to claim 8, wherein said swivel coupling at the same time substantially provides sealing between said lower casing and upper casing.

11. A pivoting power transmission unit according to claim 8, wherein said skirt of said upper casing comprises four coaxial cylindrical arc-shaped portions, forming two pairs of feet curved towards each other, and such that for each pair, the two corresponding feet are attached to said swivelling part of one respectively of the two bearings, either side of a plane passing through the axes of rotation and pivoting.

12. A pivoting power transmission unit according to claim 11, wherein each cylindrical arc-shaped foot is attached to the corresponding swivelling part by a set of fasteners, distributed along said foot and over a peripheral portion of said swivelling part.

13. A pivoting power transmission unit according to claim 12, wherein each cylindrical arc-shaped foot has an attachment face which faces outwardly from said skirt and substantially in a shape of a portion of an annular ring radial relative to the pivot axis and coaxial about said pivot axis, and by which said foot is attached by said set of fasteners, aligned substantially along the pivot axis, to said corresponding swivelling part.

14. A pivoting power transmission unit according to claim 12, wherein each swivelling part comprises a sleeve which is rotatable about the corresponding stationary part of the corresponding bearing, and supporting an attachment flange, projecting radially outwards relative to the pivot axis, by which said swivelling part, on the one hand, bears against and is attached by a ring of fasteners to one respectively of two annular rings, delimited in diametrically opposite positions relative to the axis of rotation on said lower casing and radial and coaxial about the pivot axis, to attach said swivelling part to said lower casing, and on the other, bears against and is attached by each of two sets of fasteners against each respectively of the feet of one respectively of said pairs of feet of said skirt, to attach said swivelling part to said upper casing, radially outside the fasteners to said lower casing.

15. A pivoting power transmission unit according to claim 8, wherein said lower casing encloses an external peripheral annular gear of a stage of pinions of said transmission unit, and said annular gear is attached by a set of threaded fasteners to said lower casing, without being attached to said upper casing.

16. A pivoting power transmission unit according to claim 1, wherein said convergent part of said upper casing is a substantially truncated cone-shaped section of casing.

17. A pivoting power transmission unit according to claim 1, wherein said convergent part of said upper casing is a section of casing in the form substantially of a truncated pyramid with a cross-section, perpendicularly to said axis of rotation, which is substantially quadrangular with one of rounded sides and corners with concave faces turned towards said axis of rotation.

18. A convertible aircraft comprising at least one tiltable rotor movable from a first position in which the at least one tiltable rotor operates as an aeroplane propeller to a second position in which the at least one tiltable rotor operates as a helicopter main lifting rotor comprising: a pivoting power transmission unit for driving the at least one tiltable rotor, the pivoting power transmission unit comprising: a casing pivoting about a pivot axis on a non-pivoting support, said casing comprising a lower casing, which encloses at least one stage of gears of the transmission unit, and by which said casing is mounted so as to pivot on said support by two bearings coaxial about said pivot axis and spaced apart from each other therealong, each bearing having a stationary part, integral with said support, and a swivelling part, integral with said lower casing, said swivelling part being mounted so as to rotate on said corresponding stationary part about said pivot axis, said casing also comprising an upper casing, assembled to the lower casing, and in which a drive shaft, connected in rotation to said stage of gears, is mounted so that it can rotate about an axis of rotation substantially perpendicular to said pivot axis and pivoting with said casing about said pivot axis, said drive shaft being retained axially by at least one thrust bearing in part of said upper casing having a generally convergent external shape, which converges towards one end of said drive shaft projecting out of said casing and connected in rotation to said rotor, wherein said upper casing cooperates with an arrangement configured to transfer to said support via said pivot bearings at least an axial load experienced by said drive shaft during use, said arrangement extending outside said pivoting casing.

* * * * *